(12) United States Patent
Kummer et al.

(10) Patent No.: US 6,634,479 B1
(45) Date of Patent: Oct. 21, 2003

(54) THRUST PLATE FOR ROLLERS OF CENTRIFUGAL CLUTCH MODULE

(75) Inventors: Martin E. Kummer, Auburn, IN (US); Daniel Gochenour, Auburn, IN (US); Steven Peterson, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/113,313

(22) Filed: Mar. 29, 2002

(51) Int. Cl.[7] .............................................. F16D 43/08
(52) U.S. Cl. .............................. 192/105 CP; 192/30 V; 192/109 R
(58) Field of Search ...................... 192/105 CP, 105 C, 192/89.1, 30 V, 109 R

(56) References Cited

U.S. PATENT DOCUMENTS

| | | | |
|---|---|---|---|
| 2,107,075 A | * | 2/1938 | Lyman .................. 192/105 CP |
| 2,987,155 A | * | 6/1961 | Maurice et al. ......... 192/105 C |
| 3,462,205 A | * | 8/1969 | Darr et al. .................. 384/494 |
| 3,724,622 A | * | 4/1973 | Barbulesco et al. .. 192/105 CE |
| 2003/0042103 A1 | * | 3/2003 | Gochenour et al. ..... 192/105 C |

* cited by examiner

Primary Examiner—Rodney H. Bonck
(74) Attorney, Agent, or Firm—Rader, Fishman & Grauer PLLC

(57) ABSTRACT

An actuation module of a centrifugal clutch incorporates a plurality of actuating weights mounted on pivot links. The weights pivot radially outwardly under centrifugal forces induced by rotation of the actuation module. One weight is secured to each of the pivot links, and springs counter the radially outward movements of the weights. Each weight defines a slot; a roller is disposed in each of the slots. Each slot defines a pair of spaced walls; each of the rollers is rotatable on an axle secured between one pair of walls. The rollers engage cam ramps that rotate with the module but are axially displaceable with respect thereto for engagement and disengagement of the clutch. Each pair of walls is oriented in direction of pivotal movement of its associated weight. A roller thrust plate is secured between each roller and the wall of the slot spaced farthest away from the pivot link.

20 Claims, 6 Drawing Sheets

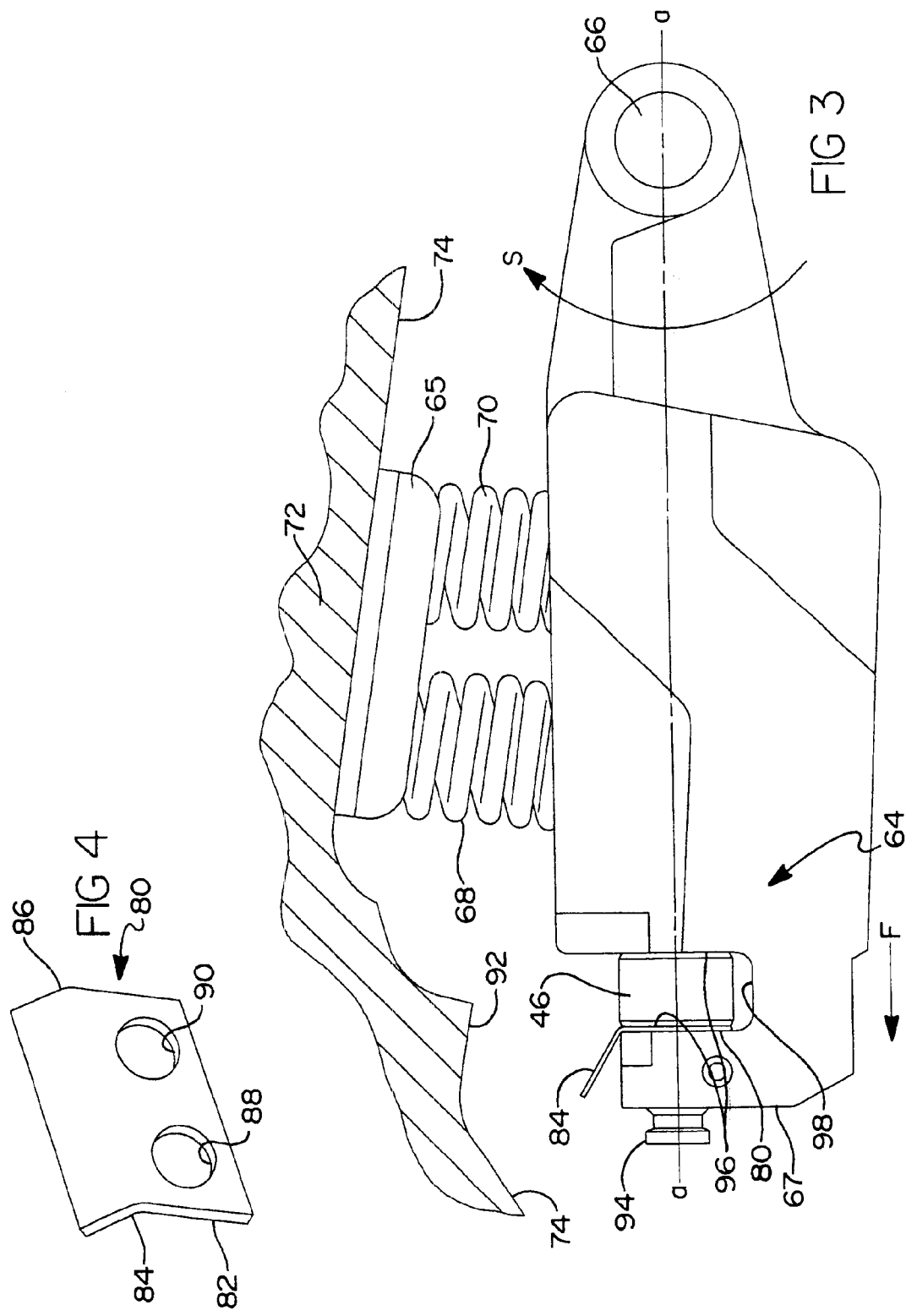

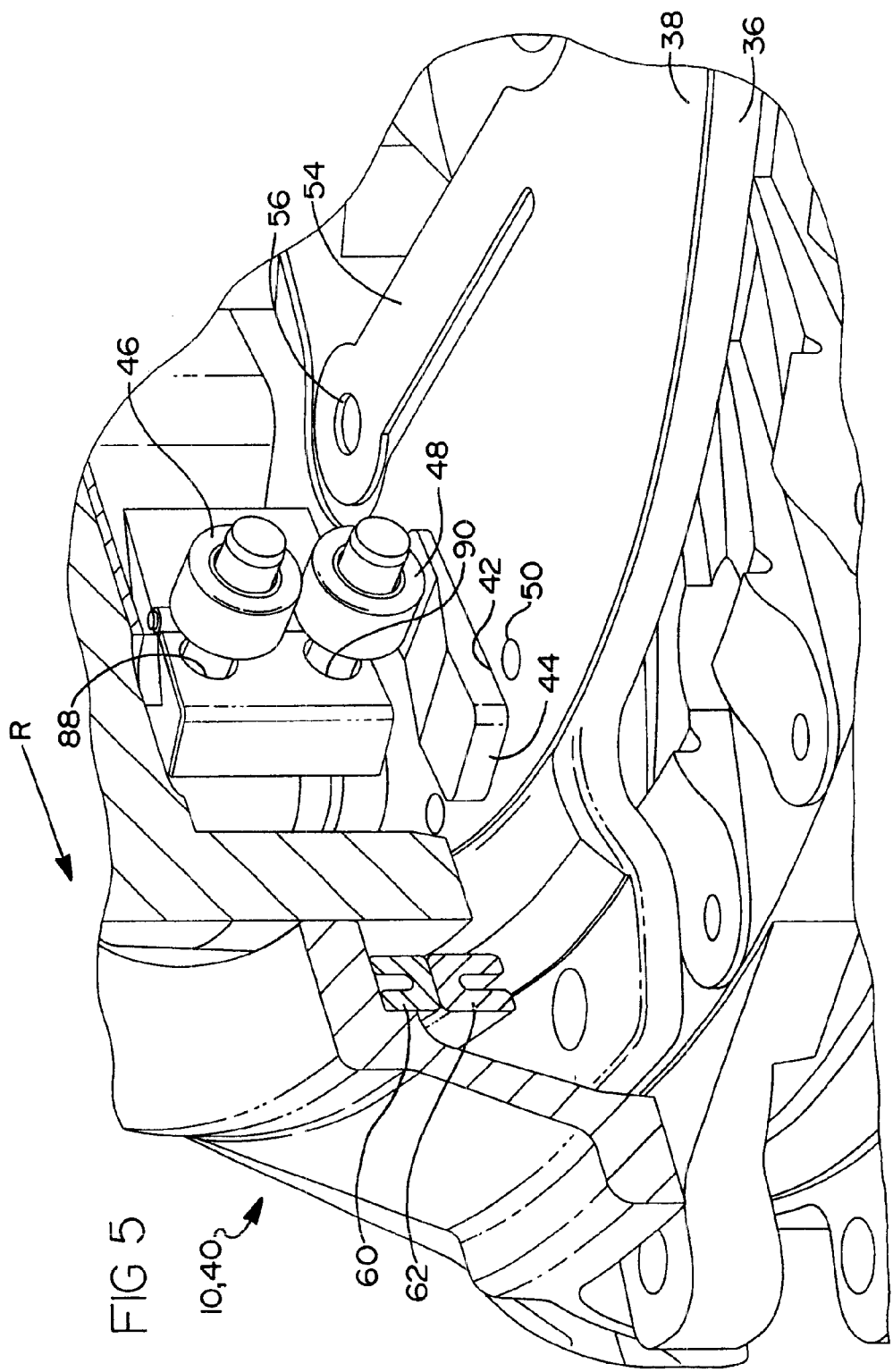

US 6,634,479 B1

THRUST PLATE FOR ROLLERS OF CENTRIFUGAL CLUTCH MODULE

BACKGROUND OF THE INVENTION

1. Field of Invention

This invention relates generally to improvements in centrifugal modules of automatically actuated clutches. More particularly, the invention relates to improvements in high speed functioning of weight and roller structures contained in such centrifugal modules, and commensurately to reduced wear rates of rollers subject to centrifugal forces within the modules.

2. Description of the Prior Art

Automatically actuated centrifugal clutches employed with heavy-duty electromechanical highway line-haul truck transmissions include so-call centrifugal actuation modules that house centrifugally actuated weights. The centrifugal modules are affixed to engine flywheel rings, and each of a plurality of centrifugally actuated weights is adapted to swing in an arc about a pivot link fixed to the module housing structure. As such, the weights contained within the modules are radially outwardly movable against resistive spring forces as a function of engine speed; the higher the speed, the greater the movement between limits. Rollers attached to the weights are adapted to roll atop ramp segments that are cammed for clutch engagement and disengagement, as will be appreciated by those skilled in the art.

The rollers operate under relatively high centrifugal forces, and thus give rise to issues that work against satisfactory operation of the modules over the useful lives of the clutches. For example, in one centrifugal module rigidly attached to an engine flywheel ring, the rollers are supported for rotation on axles fixed in slots provided in the weights. The mass of the rollers subjects the rollers to centrifugal forces that urge the sides of the rollers into walls of the slots. The result is an accelerated wear of the rollers, and scouring of the slot walls. The condition is exacerbated at higher clutch rotation speeds at which the operative centrifugal forces become higher. Thus, a need exists to avoid premature deterioration of the rollers, along with scouring of the walls of the slots subject to such roller contact, particularly under higher clutch rotation speeds associated with centrifugal clutch operation at highway line-haul speeds.

SUMMARY OF THE INVENTION

The present invention provides improved operation of an actuation module of a centrifugally actuated vehicular clutch. The actuation module incorporates a plurality of clutch engagement actuating weights. The weights are mounted on pivot links that are adapted to permit the weights to pivot radially outwardly under centrifugal forces induced by rotation of the actuation module. One weight is secured to each of the pivot links, and in one described embodiment, a set of springs counters the radially outward movement of the weights.

Each weight defines a slot, and a roller is disposed in each of the slots. Each slot defines a pair of spaced walls, and each of the rollers is rotatable on an axle secured between the pair of walls. The rollers engage cams (ramps) that rotate with the module but are axially displaceable with respect to the module for engagement and disengagement of the clutch. Each of the rollers, as well as each of the associated pairs of walls, is oriented in a direction of pivotal movement transverse to the longitudinal axis of its associated weight. A roller thrust plate is secured between each roller and the wall of the slot spaced farthest away from the pivot link to avoid deterioration of the roller and commensurate scouring of the slot wall.

BRIEF DESCRIPTION OF THE DRAWINGS

FIG. 3 is an enlarged side view of one of the centrifugal weights employed in the centrifugal module of FIG. 2, demonstrating a first embodiment of a thrust plate and roller arrangement for the centrifugal clutch of the present invention.

FIG. 4 is a perspective view of the embodiment of the thrust plate of FIG. 3.

FIG. 5 is an enlarged perspective cut away view of a portion of the centrifugal clutch of FIG. 1, demonstrating interaction of a roller system of the clutch actuation module with a ramp segment of a clutch actuation ramp plate.

DETAILED DESCRIPTION OF THE EMBODIMENTS

Figure 1:
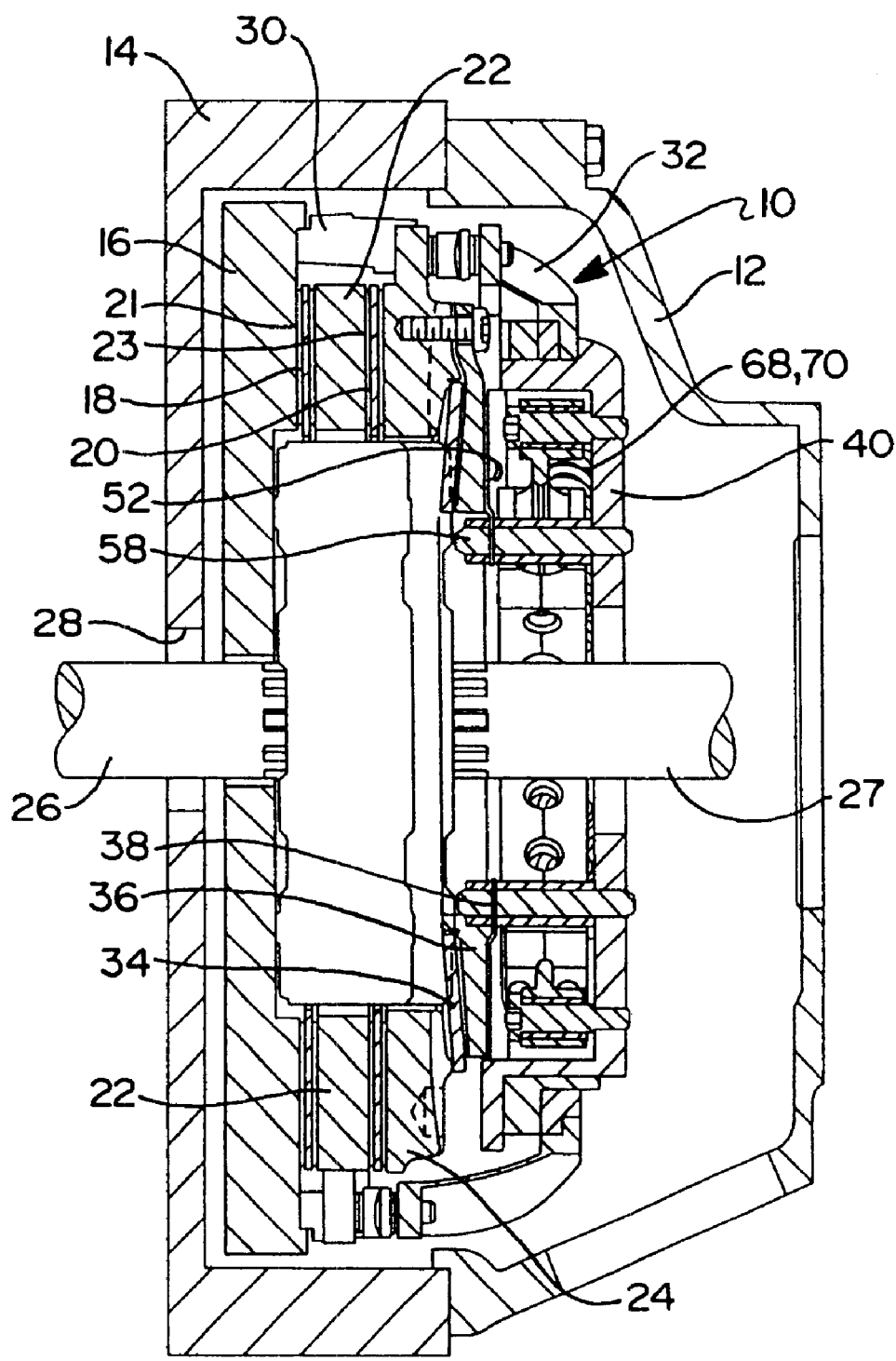
FIG. 1 is a cross-sectional view of a centrifugal clutch assembly that incorporates the clutch roller thrust plate of the present invention.

Referring initially to FIG. 1, an automatically actuated centrifugal clutch 10 is designed for use in a motor vehicle, not shown. The clutch 10 is enshrouded between a bell housing 12 of a transmission (also not shown) and a flywheel housing 14 coupled externally to the bell housing 12. The centrifugal clutch 10 is of the normally unengaged type that relies upon engine speed to initiate actuation, and hence engagement. The clutch may be used with an electromechanical style automatic transmission, and is employed in vehicles that are normally without a clutch pedal.

The flywheel housing 14 envelops an engine flywheel 16 that is bolted to an engine crankshaft 26 for direct rotation therewith. In the embodiment described, a pair of friction plates 18, 20 includes friction linings 21, 23, secured to the plates 18, 20 via fasteners (not shown), which may be rivets, bolts, or adhesives, etc. The friction plates are adapted to be releasably clasped between the flywheel 16, an intermediate plate 22, and a pressure plate 24. The friction plates 18, 20 are directly attached to, and rotate with, a transmission input shaft 27. Those skilled in the art will appreciate that the transmission input shaft 27 is positioned coaxially with respect to the engine crankshaft 26, but is axially spaced therefrom as depicted.

The engine crankshaft 26 is affixed to the engine flywheel 16. For this purpose, the shaft 26 extends through an aperture 28 of the flywheel housing 14 as shown. A circumferentially extending flywheel ring 30 is rigidly affixed to the flywheel 16, and an external clutch cover 32 is secured to the flywheel ring. In some cases, the ring 30 and cover 32 may be the same part, and this invention is intended to cover such cases. The clutch cover 32, the pressure plate 24, and the intermediate plate 22 are all affixed to the flywheel ring 30 in a manner such that all of the respectively described members are permitted to move axially, though non-rotatably, in reference to the flywheel ring. Thus, as the flywheel ring 30 spins during operation of the vehicle engine, the described coupled members all rotate together at the same speed as the ring 30.

Indeed all members as will be described herein rotate with the flywheel ring 30 with the exception of the pair of friction plates 18, 20 that are respectively clasped, i.e. "clutched", between the flywheel 16, the axially movable intermediate plate 22, and axially moveable pressure plate 24, as described above. In addition, it will be appreciated that all of the plates, apart from the plates 18, 20 are annular in shape, as required to permit the transmission input shaft 27 to pass through the centers of each of the plates that rotate with the flywheel ring 30.

Figure 2:
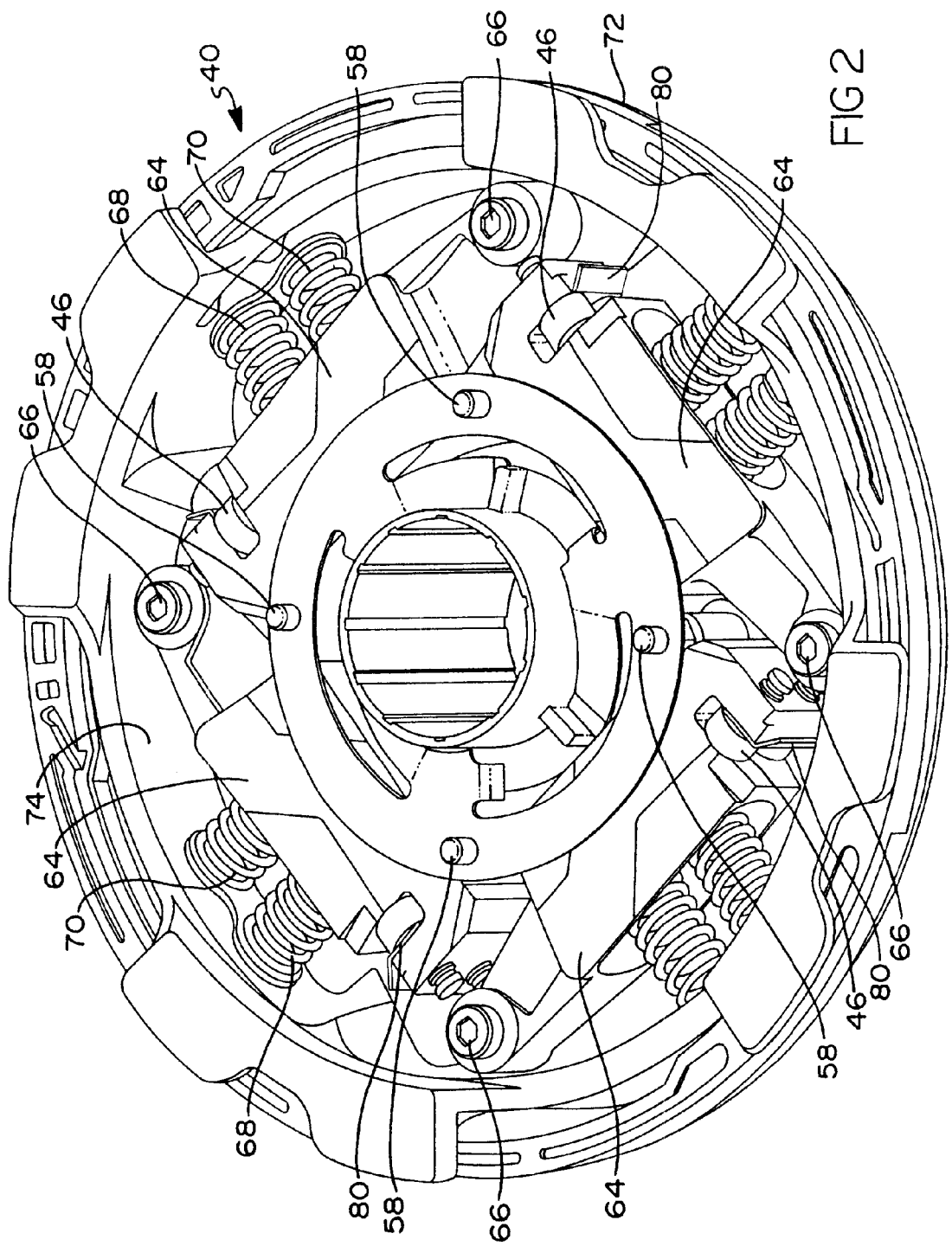
FIG. 2 is an enlarged perspective view of a centrifugally actuated weight-spring clutch actuation (engagement) module, shown as part of the clutch assembly of FIG. 1, that incorporates the thrust plate of the subject invention.

Continuing reference to FIG. 1, any leftward movement of the pressure plate 24 actuates the clutching of the friction plates 18, 20. Referring now also to FIG. 2, in order to initiate such clutching, a centrifugal module 40 is provided, the module having a circumferentially arranged plurality of weights 64 that are pivotally disposed within a housing 72 of the centrifugal module 40. The weights are attached to pivot links 66 fixed to a rear portion (hidden) of the housing 72, and are adapted to swing radially outwardly against centrifugal force induced upon them by engine speed. The amount of angular pivotal movement of the weights 64 is controlled by compression springs 68, 70 that are secured between the weights 64 and the internal diameter 74 of the module housing 72.

Making reference now to FIGS. 3 and 4, one of the centrifugal weights 64 is shown isolated from the normally circumferentially arranged plurality of centrifugal weights 64 (FIG. 2). It will thus be appreciated that each centrifugal weight 64 pivots in an arc S about a pivot link 66 that is fixed to the noted rear portion of the module housing 72. To the extent that the module 40 (FIG. 2) rotates at variable rates of speed, the springs 68 and 70 will be effective to limit movement of the pivotal weight 64 along arc S as a function of amount of centrifugal force on the weight 64. In FIG. 3, it will be apparent that the springs 68 and 70 are supported against a spring seat 65 adapted to hold the springs fixedly in-place on the internal diameter 74 of the housing 72.

Continuing reference to FIG. 3, in combination with FIG. 5, it will further be appreciated that rollers 46, 48 are supported on axles 94 that extend between parallel walls 96 of a slot 98 formed within each weight 64. The axles 94 extend parallel to an axis a-a that forms a longitudinal axis of the weight 64. The rollers 46, 48 are thus adapted to move in a direction transverse to the longitudinal axis a-a of the weight 64. It will further be appreciated that each of the rollers 46, 48 has a mass that will be subjected to centrifugal forces as the weight 64 is centrifugally rotated. Thus, the rollers 46, 48 will tend to be slung radially outwardly, i.e. to be urged in a direction of the arrow F, so as to create a scouring of the wall 96 positioned farthest away from the pivot link 66, hereinafter called the "outer wall." In some cases, the interaction between the outer wall 96 and the rollers can create conditions under which the clutch assembly 10 will be unable to disengage. The issue is particularly exacerbated by the fact that the weight 64 is formed typically of cast iron, a relatively soft material compared to the typically hardened steel material of the rollers 46, 48.

In order to alleviate such scouring, and to avoid premature demise of the rollers 46, 48, a thrust plate 80, best shown in FIG. 4, is interposed between the outer wall 96 and the rollers 46, 48. The thrust plate of the described embodiment is formed of VESPEL®, a plastic composite material. Alternatively, a carbon steel or a brass material can be used. The thrust plate material in any event will be formed of bearing grade material in order to assure an adequate useful life of the actuation module. Finally, the thrust plate 80 includes a pair of apertures 88, 90 through which extend axles 94 for support of the rollers 46, 48, as will be appreciated by those skilled in the art.

Referring in more detail to FIG. 5, the weight 64 has been cut away to better reveal action of the rollers 46, 48, which move radially outwardly in direction R along ramp segments 44 of a clutch ramp plate 36. The rollers 46, 48 are fixed within the slots 98 of the weights 64 as noted above, and thus move to cause the ramp plate 36 to move leftwardly (FIG. 1) against the force of a resilient diaphragm spring 34 (FIG. 1). This action produces the clutching action earlier described, wherein the friction plates 18, 20 become coupled, i.e. rotationally locked, to the flywheel 16, as will be appreciated by those skilled in the art.

Turning momentarily back to FIG. 1, the ramp plate 36 directly engages the diaphragm spring 34, as previously noted. In accordance with this described embodiment, an annular drive reaction plate 38 (FIGS. 1 and 5) of a thin spring metal is interposed between the ramp plate 36, ramp segments 44 and rollers 46, 48 of the centrifugal clutch actuation module 40. In the described embodiment, the plate 38 is formed of high carbon spring steel, such as SAE 1080 spring steel. The drive reaction plate includes apertures 42 (FIG. 5) for receiving and capturing a plurality of the ramp segments 44 that are circumferentially angularly distributed about the ramp plate 36, each segment being rigidly secured to the ramp plate 36. In the described embodiment, the apertures 42 are also generally rectangular in shape, so as to closely circumscribe the ramp segments 44, as desirable for greatest effectiveness.

Those skilled in the art will appreciate that normally the diaphragm spring 34 is preloaded in order to reduce amount of clutch plate travel required to achieve plate clamp load sufficient to engage the clutch. Typically, the amount of preload in clutches adapted for use in heavy-duty vehicles is measured in the thousands of pounds. Accordingly, at a clutch rotation of approximately 1400 RPM, the preload force of the diaphragm spring 34 in the described embodiment is overcome (approximately 4000 pounds). At this point, the weights 64 will tend to swing outwardly along arc S (FIG. 3) rather abruptly, fully compressing the springs 68, 70, and causing the radially outwardly end 67 of the weight 64 to swing into the internal diameter 74 of the module housing 72. The resultant noise can be audible to an operator of a vehicle depending on effectiveness of the dampening of engine noise, which can vary from one vehicle to another. Referring now more particularly to FIG. 4, those skilled in the art will appreciate that for purposes of dampening noise created when the weight 64 strikes the internal diameter 74, the thrust plate 80 includes a spring tab portion 84 that is angularly attached at 86 to the roller thrust plate portion 82. In the described embodiment, the spring tab portion 84 is adapted to make a dampened contact with a strike surface 92 formed in the internal diameter 74, as shown (FIG. 3).

For optimized operation, circumferentially spaced pairs of the spring-loaded rollers 46, 48 are adapted to directly engage respective ramp segments 44 of the type shown in FIG. 5. The drive reaction plate 38 further includes apertures 50 for attaching the plate 38 directly to the ramp plate 36 via fasteners 52 (FIG. 1), which may be bolts or rivets for example. The plate 38 also includes a plurality of spaced resilient straps 54 having apertures 56 to permit the attachment of the straps 54 to connection lugs 58 (FIG. 1) of the module 40.

The spring metal straps 54 (FIG. 5) of the plate 38 are secured to the lugs 58 to provide a resilient axial relative movement capability between the ramp plate 36 and the module 40; no relative rotational movement is enabled by the connection. Such a connection facilitates operation of a pair of wear ramps 60, 62 (FIG. 5) employed to compensate for wear of the friction linings of the friction plates 18, 20.

Intended operation of the centrifugal clutch assembly 10 is as follows. As the speed of the engine increases, e.g. as measured in revolutions per minute of the crankshaft 26, the weights 64 (FIG. 2) will be urged radially outwardly against the compressive forces of the springs 68, 70. Centrifugal forces on the weights will cause the weights to pivot radially outwardly a distance proportional to the engine speed. In the described embodiment, the clutch 10 will remain disengaged at idle speeds in the range of 750 rpm, as the forces of the springs 68, 70 will be sufficient to counter the centrifugal forces on the weights 64 at that engine speed. Upon additional engine fueling rates, the engine speed will progress to higher values resulting in clutch actuation movement initiated by the rollers 46, 48 against the ramps 44. By the time the clutch assembly 10 is rotating at speeds in the range of 900 to 1200 rpm, the clutch 10 will be fully engaged, and the friction disks 18, 20 fully clutched.

Figure 6:
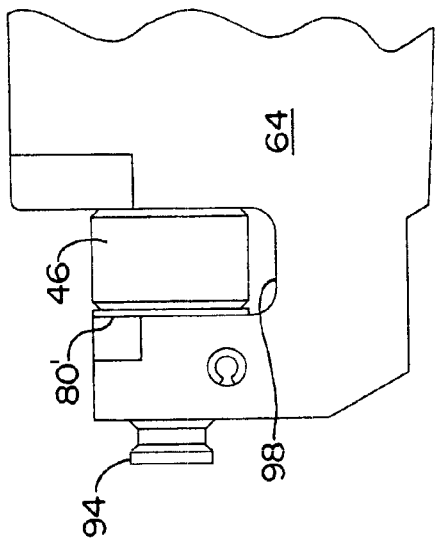
FIG. 6 is a fragmentary side view of an alternate thrust plate and roller arrangement for the centrifugal clutch of the present invention.
Figure 7:
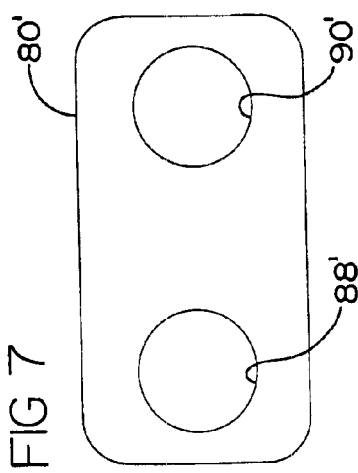
FIG. 7 is a face view of the alternate embodiment of the thrust plate shown in FIG. 6.

FIGS. 6 and 7 display an alternative embodiment of a thrust plate 80' for intended use in the weight and roller structures 64, 46 of the invention. The thrust plate 80' is without a spring tab portion 84 of the first described embodiment, and may be particularly suitable for environments in which highly preloaded diaphragm spring systems are not applicable, or in environments where likelihood of abrupt force changes are minimal.

Figure 8:
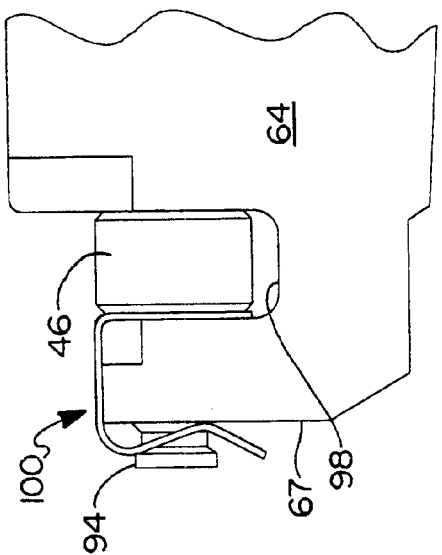
FIG. 8 is a fragmentary side view of another alternate thrust plate and roller arrangement for the centrifugal clutch of the present invention.
Figure 9:
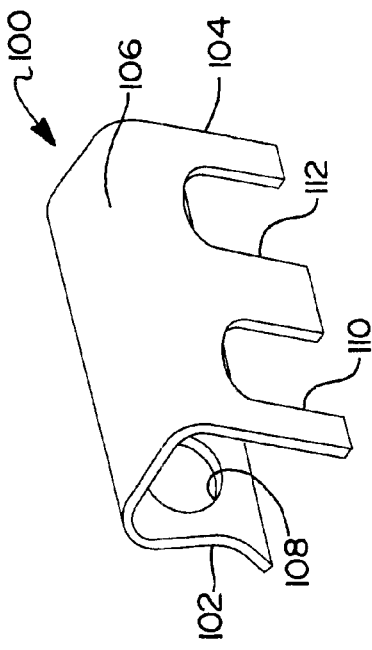
FIG. 9 is a perspective view of the alternate embodiment of the thrust plate structure shown in FIG. 8.

FIGS. 8 and 9 depict an additional embodiment of a U-shaped thrust plate 100 that includes a pair of parallel side portions 102, 104 connected by a transverse connective portion 106. The side portion 102 is adapted to be secured to end portions of the axles 94 that extend outside of the slot 98. The thrust plate 100 is preferably formed of spring steel for enhancing clip-on resiliency. Obviously, the connective portion 106 is sized to fit over the end 67 of the weight 64 and into the slot 98 as shown. Apertures 108 in the side portion 102 accommodate the axles 94, while slotted openings 110 and 112 are adapted to slip over the portion of the axles 94 disposed within the slot 98, as will be appreciated by those skilled in the art.

Figure 10:
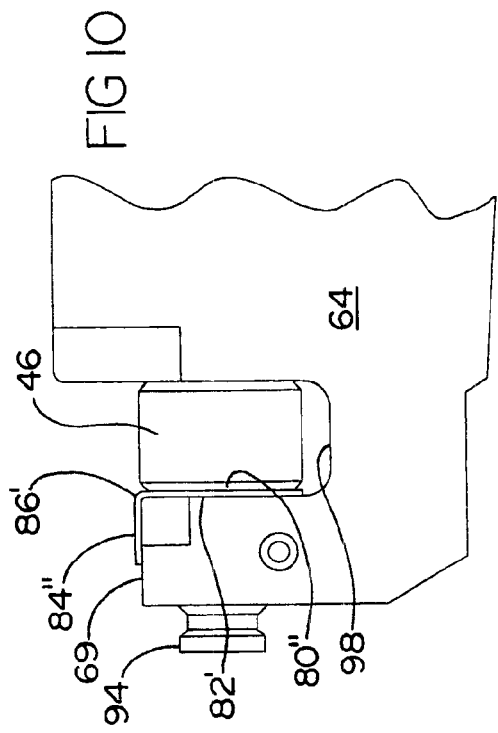
FIG. 10 is a fragmentary side view of yet another alternate thrust plate and roller arrangement for the centrifugal clutch of the present invention.
Figure 11:
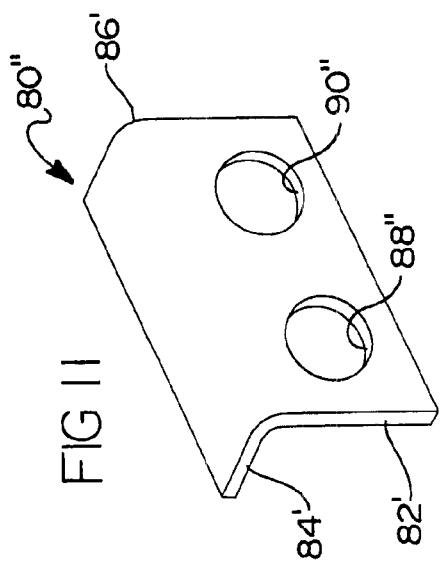
FIG. 11 is a perspective view of the alternate embodiment of the thrust plate structure shown in FIG. 10.

FIGS. 10 and 11 depict yet another embodiment of a thrust plate 80" that is a variation of the thrust plate 80 of the first described embodiment of FIGS. 3 and 4. The thrust plate 80" has a tab portion 84' that is analogous to the spring tab portion 84 employed in the first described embodiment. However, in the thrust plate 80" the tab 84' is formed orthogonally at 86' to the roller thrust plate portion 82'. As such, the spring tab portion 84' is formed to permanently lie against the upper surface 69 of the weight 64, and thus provides no damping function similar to the spring tab portion 84 of the embodiment of FIGS. 3 and 4.

Figure 12:
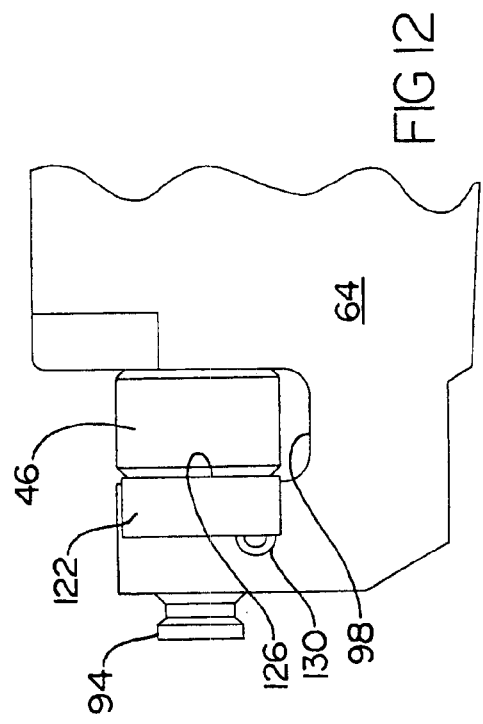
FIG. 12 is a fragmentary side view of still another alternate thrust plate and roller arrangement for the centrifugal clutch of the present invention.
Figure 13:
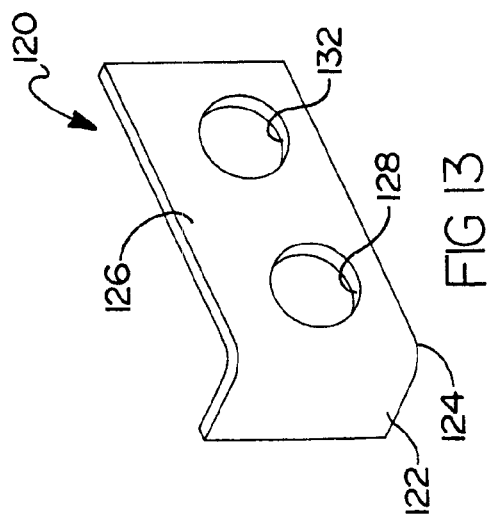
FIG. 13 is a perspective view of the alternate embodiment of the thrust plate structure shown in FIG. 12.

Finally, the embodiment of a thrust plate 120 as displayed in FIGS. 12 and 13 is adapted to provide protection of an oil fitting cap 130. The cap 130 covers an oil fitting (not shown) for assuring sufficient lubrication of the described shafts 94 and rollers 46, 48. For this purpose, a side flange 122 is orthogonally connected at 124 to a roller thrust plate portion 126. As in all except one of the previously described embodiments, a pair of apertures 128 and 132 are provided to accommodate the axles 94 for securement of the thrust plate 120 to the weight and roller structure 64, 46.

It is to be understood that the above description is intended to be illustrative and not limiting. Many embodiments will be apparent to those skilled in the art upon reading the above description. For example, although only a single thrust plate has been described in reference to each pair of rollers 46, 48, an opposing thrust plate may be employed at the opposite ends of the rollers for other reasons, such as dimensional tolerance variations of the ramp segments, as one example. The scope of the invention should be determined, however, not with reference to the above description, but with reference to the appended claims with full scope of equivalents to which such claims are entitled.

What is claimed is:

1. A unitary thrust plate for absorbing side loads of rollers supported on axles, said rollers having a defined direction of roll, said rollers subject to centrifugal forces;

said thrust plate comprising at least one aperture for receiving an axle, and further comprising at least one substantially planar thrust surface for carrying thrust loads imposed by centrifugal forces to one side of said rollers, wherein at least a portion of said thrust load is directed orthogonally to the direction of roll, and wherein said thrust surface extends generally parallel to the direction of roll.

2. The thrust plate of claim 1, wherein said plate comprises at least two apertures, each adapted to receive one axle.

3. The thrust plate of claim 2, wherein said plate comprises a generally U-shaped structure having a pair of substantially parallel side portions connected together by a transverse connective portion, wherein one of the side portions comprises at least one aperture adapted to be secured to an end portion of said axle.

4. The thrust plate of claim 3, wherein said plate further comprises a spring steel material and wherein the second side portion comprises slotted openings adapted to slip over portions of axles spaced from said end portions of axles.

5. The thrust plate of claim 4, wherein said thrust plate comprises a metal bearing grade material.

6. The thrust plate of claim 1, wherein said thrust plate comprises a metal bearing grade material.

7. The thrust plate of claim 1, wherein said thrust plate comprises a plastic composite material.

8. The thrust plate of claim 1, wherein said plate further comprises a spring tab portion contiguously attached to but extending angularly outwardly with respect to said substantially planar thrust surface, wherein said spring tab portion is adapted to dampen impact of said thrust plate, and impact of an associated structure to which said plate is fixed, with a reference object to which said thrust plate is not fixed.

9. The thrust plate of claim 8, wherein said spring tab portion extends radially outwardly in a direction of applied centrifugal force at an angle greater than 90 degrees with respect to said substantially planar thrust surface of said thrust plate.

10. The thrust plate of claim 9, wherein said thrust plate comprises a metal bearing grade material.

11. The thrust plate of claim 9, wherein said thrust plate comprises a plastic composite material.

12. The thrust plate of claim 1, wherein said plate further comprises a tab portion contiguously attached to, but extending angularly with respect to, said substantially planar thrust surface, wherein said tab portion extends at an angle approximately equal to 90 degrees.

13. The thrust plate of claim 12, wherein said thrust plate comprises a metal bearing grade material.

14. The thrust plate of claim 12, wherein said thrust plate comprises a plastic composite material.

15. The thrust plate of claim 1, wherein said plate further comprises a side flange extending angularly from the thrust surface, said side flange adapted to protect an oil fitting.

16. The thrust plate of claim 15, wherein said thrust plate comprises a metal bearing grade material.

17. The thrust plate of claim 15, wherein said thrust plate comprises a plastic composite material.

18. A centrifugal clutch actuation module adapted for securement to and rotation with a clutch flywheel; wherein said actuation module comprises a plurality of pivot links and actuating weights; wherein said actuating weights are adapted to pivot radially outwardly under centrifugal force induced by rotation of said actuation module, one of each weights being secured to each of said pivot links; said module further comprising radial springs adapted to counter radially outward movements of said actuating weights under centrifugal forces on said weights; said weights comprising slots, and further comprising rollers disposed in said slots, each slot defining a pair of spaced walls adapted to contain each roller; each of said rollers being rotatable on an axle secured within and between one of said pair of said walls; at least one of said rollers adapted to engage a cam ramp, said cam ramp adapted to rotate with said module but axially displaceable with respect thereto for engagement and disengagement of a clutch; wherein said pairs of walls are oriented in directions of pivotal movements of each of said weights about each of said respective pivot links, wherein one of each of said pairs of walls is spaced farthest away from its respective pivot link relative to the other of said walls, and wherein a roller thrust plate is secured to at least one of said axles, said thrust plate being secured between said roller and said one of said pair of walls spaced farthest away from said pivot link.

19. The centrifugal clutch actuation module of claim 18, wherein said thrust plate comprises a bearing grade material.

20. The centrifugal clutch actuation module of claim 18, wherein said thrust plate comprises a plastic composite material.

* * * * *